UNITED STATES PATENT OFFICE.

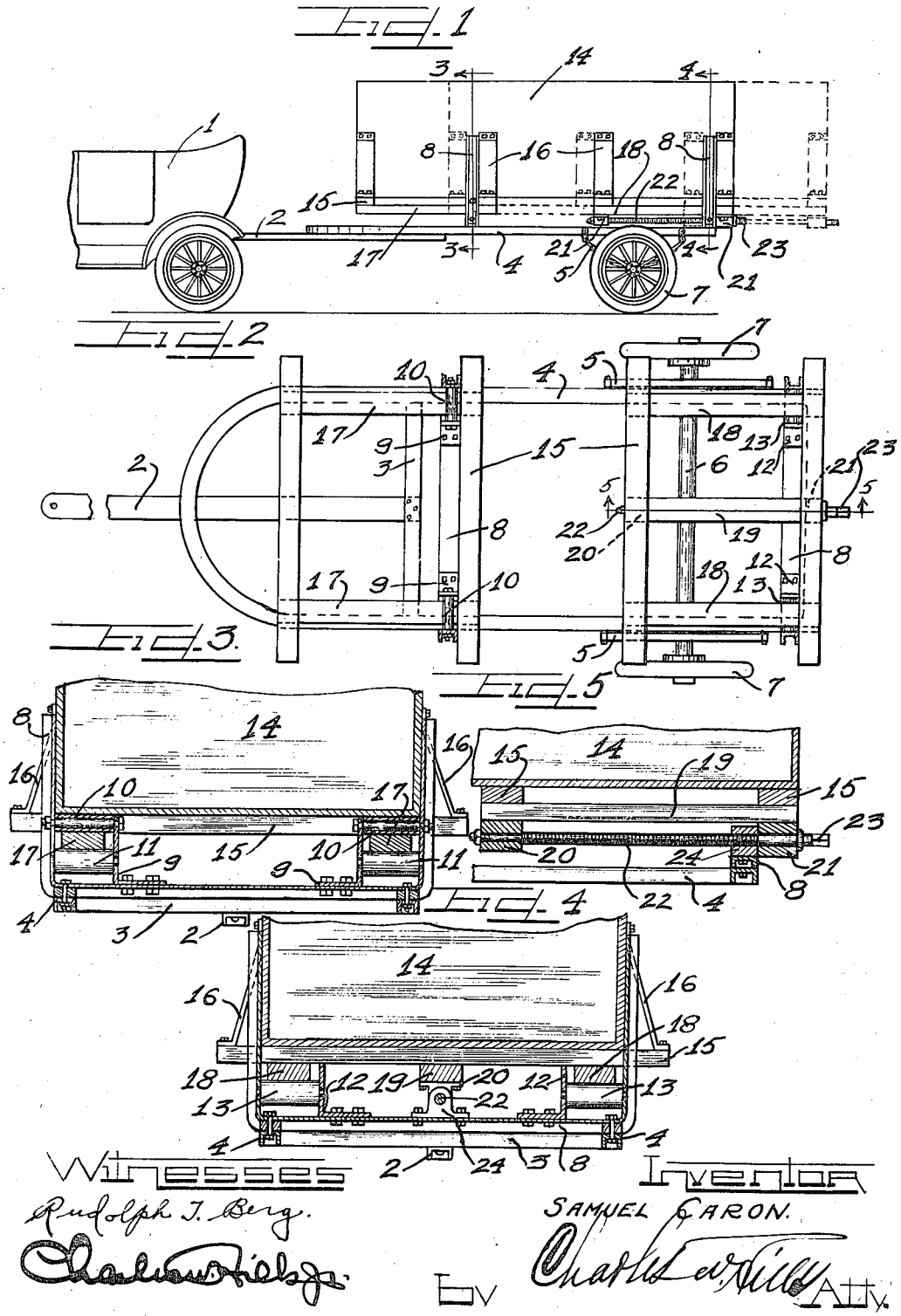

SAMUEL CARON, OF CHICAGO, ILLINOIS.

ADJUSTABLE VEHICLE-BODY.

1,320,601.  Specification of Letters Patent.  Patented Nov. 4, 1919.

Application filed March 16, 1918. Serial No. 222,809.

*To all whom it may concern:*

Be it known that I, SAMUEL CARON, a citizen of the United States, and a resident of the city of Chicago, in the county of Cook and State of Illinois, have invented certain new and useful Improvements in Adjustable Vehicle-Bodies; and I do hereby declare that the following is a full, clear, and exact description of the same, reference being had to the accompanying drawings, and to the numerals of reference marked thereon, which form a part of this specification.

This invention relates to an improved form of a vehicle trailer constructed to permit the body portion thereof to be adjusted with respect to the wheel truck into a position therein the body portion is properly balanced.

It is an object of the invention to provide a vehicle trailer wherein certain parts thereof are adapted to be adjustably shifted on other parts to effect a change in the center of gravity of a load carried by said trailer, whereby said load may be properly balanced.

It is a further object of this invention to construct a vehicle trailer provided with a mechanism adapted to be operated to effect a proper balancing of a load carried thereon.

It is furthermore an object of the invention to construct a two wheel vehicle trailer provided with a mechanism adapted to shift or move the load carrying body with respect to the trailer wheels into a position wherein the load carrying body is properly balanced.

It is an important object of this invention to provide an adjustable vehicle trailer of simple construction and adapted to be readily adjusted to properly balance a load carried thereby.

Other and further important objects of this invention will be apparent from the disclosure in the drawings and specification.

The invention (in a preferred form) is illustrated in the drawings and hereinafter more fully described.

On the drawings:

Figure 1 is a side elevation of a trailer embodying the principles of this invention and attached to the rear of an automobile, and further showing the operation in dotted lines.

Fig. 2 is a top plan view of the trailer with the body removed.

Fig. 3 is an enlarged section taken on line 3—3 of Fig. 1, with parts broken away.

Fig. 4 is an enlarged section taken on line 4—4 of Fig. 1, with parts broken away.

Fig. 5 is an enlarged fragmentary detail section taken on line 5—5 of Fig. 2.

As shown on the drawings:

The reference numeral 1, indicates as a whole an automobile or other vehicle having removably attached or connected to the rear thereof a trailer covering the principles of this invention, and comprising a shaft or tongue 2, having the rear end thereof rigidly secured to a cross-bar 3, forming a part of the forward portion of a chassis or frame 4. Mounted near the rear end of each of the side sills of the chassis 4, is a spring 5, resting on and secured to an axle 6, on the ends of which wheels 7, are journaled. Rigidly secured transversely upon the chassis 4, near the front and rear thereof are U-shaped channel brackets or supports 8, the ends of which project vertically upwardly as shown in Fig. 3. Securely mounted upon the horizontal portion of the front bracket 8, and a short distance from each of the upright portions of said bracket is an angle bracket or plate 9, one flange of which rests on and is secured to the bracket 8, while the other flange is apertured and extends vertically upwardly opposite and parallel to the respective upright end of said front bracket 8, as clearly shown in Fig. 3. Rotatably supported between each of the uprights of the front bracket 8, and the upright flange of the angle plate 9, mounted adjacent thereto is an upper roller 10, and a lower roller 11, spaced a short distance apart. Also securely mounted upon and near each end of the horizontal portion of the rear bracket 8, is an angle plate or L-bracket 12, one flange of which is rigidly secured to the rear bracket with the other flange apertured and extendingly upwardly opposite and parallel to the respective upright portion of said rear bracket as shown in Fig. 4. Rotatably mounted between each of the bracket uprights and the upright flanges of the angle plates 12, is a rear roller 13, disposed in a plane with the front lower rollers 11.

Disposed above the chassis 4, is an open box, carriage or body 14, having a plurality of spaced cross-bars 15, disposed transversely across the bottom thereof and rigidly secured thereto with the ends of said cross-bars extending beyond the sides of the body 14, to permit the lower angled ends of braces 16, to be rigidly secured thereto. The braces incline inwardly toward the sides of the body and have the upper ends thereof secured thereto. Rigidly secured to and connecting the two foremost cross-bars 15, to each other is a pair of longitudinally disposed parallel track bars or guides 17, which are engaged between the respective rollers 10 and 11, to support the front end of the body 14. A pair of longitudinal rear track bars or guides 18, is rigidly secured at right angles to the bottom of the two rear cross-bars and rest upon the rear rollers 13, to afford a support for the rear portion of the body 14. Rigidly secured centrally on the bottom of the two rear cross-bars 15, is a bar 19, on the under surface of the ends of which is secured a passaged front bearing block 20, and a passaged rear bearing block 21, which have the passages thereof alined with one another to rotatably support therein the reduced ends of a feed screw 22, the rear end of which extends a short distance beyond the rear end of the body 14, and is squared as denoted by the reference numeral 23, to receive a crank or other tool to permit rotation of said feed screw. Rigidly mounted centrally upon the upper surface of the horizontal portion of the rear bracket 8, is a bearing block 24, having a threaded passage therein which is in alinement with the passages in the bearing blocks 20 and 21. As shown in Fig. 5, the feed screw 22, is movably threaded through the chassis bearing block 24.

The operation is as follows:

With the trailer parts assembled as described and shown a load carried in the body 14, will exert a force upon the roller supporting chassis 4, the rear portion only of which is supported by the springs 5, upon the axle 6. It will thus be seen that the front end of the chassis which is unsupported and merely connected to the automobile 1, by the tongue 2, is not adapted to carry any of the load. It therefore becomes necessary to change the center of gravity of the load and the body 14, to properly balance the same so that the entire weight thereof will be supported by the springs 5, and the wheels 7. The proper balancing of the load and the weight of the body 14, is easily accomplished by applying a crank to the squared end 23, of the feed screw 22, and rotating said screw in the proper direction through the bearing block 24, whereby the body 14, is moved rearwardly into the dotted line position as shown in Fig. 1, thus changing the center of gravity of the load and properly balancing the same so that the entire weight thereof will be carried by the wheels 7. Movement of the body 14, is facilitated by the guide bars 17, which pass between and rotate the rollers 10 and 11, and the rear guide bars 18, which rest upon and rotate the rear rollers 13, when the feed screw is operated. It will thus be seen that the body 14, may be moved rearwardly or forwardly by rotation of the feed screw 22, into a position wherein the load carrying body is properly balanced.

It will of course be understood that a rack and pinion mechanism or any other suitable mechanism may be used to cause movement of the body upon the chassis of the trailer, or that the body may be rigidly mounted upon the chassis 4, and that the wheel truck mechanism be arranged to be moved forwardly or rearwardly with respect to the chassis to bring about a proper balancing of the load.

I am aware that numerous other details of construction may be changed without departing from the principles of this invention and I therefore do not purpose limiting the patent granted otherwise than necessitated by the prior art.

I claim as my invention:—

1. A vehicle trailer comprising a two wheel chassis, means thereon to permit attachment of the trailer to a vehicle, a pair of rollers mounted on each side of the chassis, a body, guide members secured thereon passing between the respective rollers comprising said pair of rollers, and means connected with the chassis and with said body adapted to adjustably move said body on said chassis.

2. A vehicle trailer comprising a two wheel chassis, means thereon for attaching the trailer to a vehicle, lower and upper rollers mounted on said chassis, a body, guide bars secured on the bottom of said body and spaced therefrom to permit the guide bars to pass between said upper and lower rollers, and means adapted to move said body on said chassis.

3. A vehicle trailer comprising a two wheel chassis, front and rear rollers rotatably mounted on said chassis, auxiliary rollers rotatably mounted above said front rollers, a trailer body, front guide members thereon adapted to pass between said front rollers and said auxiliary rollers, rear guide members on the body adapted to pass over said rear rollers, and means for adjusting the body with respect to said chassis.

In testimony whereof I have hereunto subscribed my name in the presence of two subscribing witnesses.

SAMUEL CARON.

Witnesses:
CHARLES W. HILLS, Jr.,
FRED E. PAESLER.